(12) United States Patent
Balakrishnan et al.

(10) Patent No.: US 10,691,468 B2
(45) Date of Patent: Jun. 23, 2020

(54) TECHNIQUES OF RETRIEVING BIOS DATA FROM BMC

(71) Applicant: AMERICAN MEGATRENDS INTERNATIONAL, LLC, Norcross, GA (US)

(72) Inventors: Venkatesan Balakrishnan, Chennai (IN); Sivaraman Nainar, Chennai (IN); Biswanath Basak, Chennai (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 117 days.

(21) Appl. No.: 16/144,048

(22) Filed: Sep. 27, 2018

(65) Prior Publication Data
US 2020/0104141 A1   Apr. 2, 2020

(51) Int. Cl.
G06F 9/44     (2018.01)
G06F 9/4401   (2018.01)
G06F 9/445    (2018.01)

(52) U.S. Cl.
CPC .......... *G06F 9/4416* (2013.01); *G06F 9/445* (2013.01); *G06F 9/4406* (2013.01)

(58) Field of Classification Search
CPC ....... G06F 9/4416; G06F 9/445; G06F 9/4406
See application file for complete search history.

(56) References Cited

U.S. PATENT DOCUMENTS

| 2009/0113198 A1* | 4/2009 | Liu ..................... H04L 41/0803 713/2 |
| 2013/0007430 A1* | 1/2013 | Fan ......................... G06F 9/445 713/1 |
| 2013/0138933 A1* | 5/2013 | Wang .................. G06F 13/4022 713/1 |

* cited by examiner

*Primary Examiner* — Stefan Stoynov
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. The computer system includes a BMC. The BMC receives, through a management platform on the BMC, a first part of initialization data from an initialization component of a host of the BMC. The BMC also receives an indication of a location at an initialization storage device of the host. The BMC then obtains access to the initialization storage device. The BMC reads a second part of the initialization data from the location of the initialization storage device.

20 Claims, 3 Drawing Sheets

TECHNIQUES OF RETRIEVING BIOS DATA FROM BMC

BACKGROUND

Field

The present disclosure relates generally to computer systems, and more particularly, to a baseboard management controller (BMC) and an initialization component of a host that may operate together such that the BMC can retrieve static data from the initialization component through direct access to an initialization storage device.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

A BMC may provide, through a management platform (e.g., REDFISH as described infra), management functionalities of configuration and settings of a Basic Input/Output System (BIOS) of a host of the BMC.

The REDFISH URI are exposed through the BMC. In certain configurations, the BIOS may wait for the BMC to complete booting and then the BIOS boots an Operating System (OS) of the host. During the host booting up, BIOS may send host BIOS configuration information to the BMC. This information may include static data, which contain the HTML pages and related information, and dynamic data about the current BIOS configuration at the host.

The static data sent by the BIOS may be large in size and may increase the host boot time. The communication between the BIOS and the BMC may be through many different interfaces. Each may have its own complexity and timing constraints. Accordingly, there is a need for a mechanism that allows the BMC to retrieve the static data from the host more efficiently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes a baseboard management controller (BMC). The BMC receives, through a management platform on the BMC, a first part of initialization data from an initialization component of a host of the BMC. The BMC also receives an indication of a location at an initialization storage device of the host. The BMC then obtains access to the initialization storage device. The BMC reads a second part of the initialization data from the location of the initialization storage device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
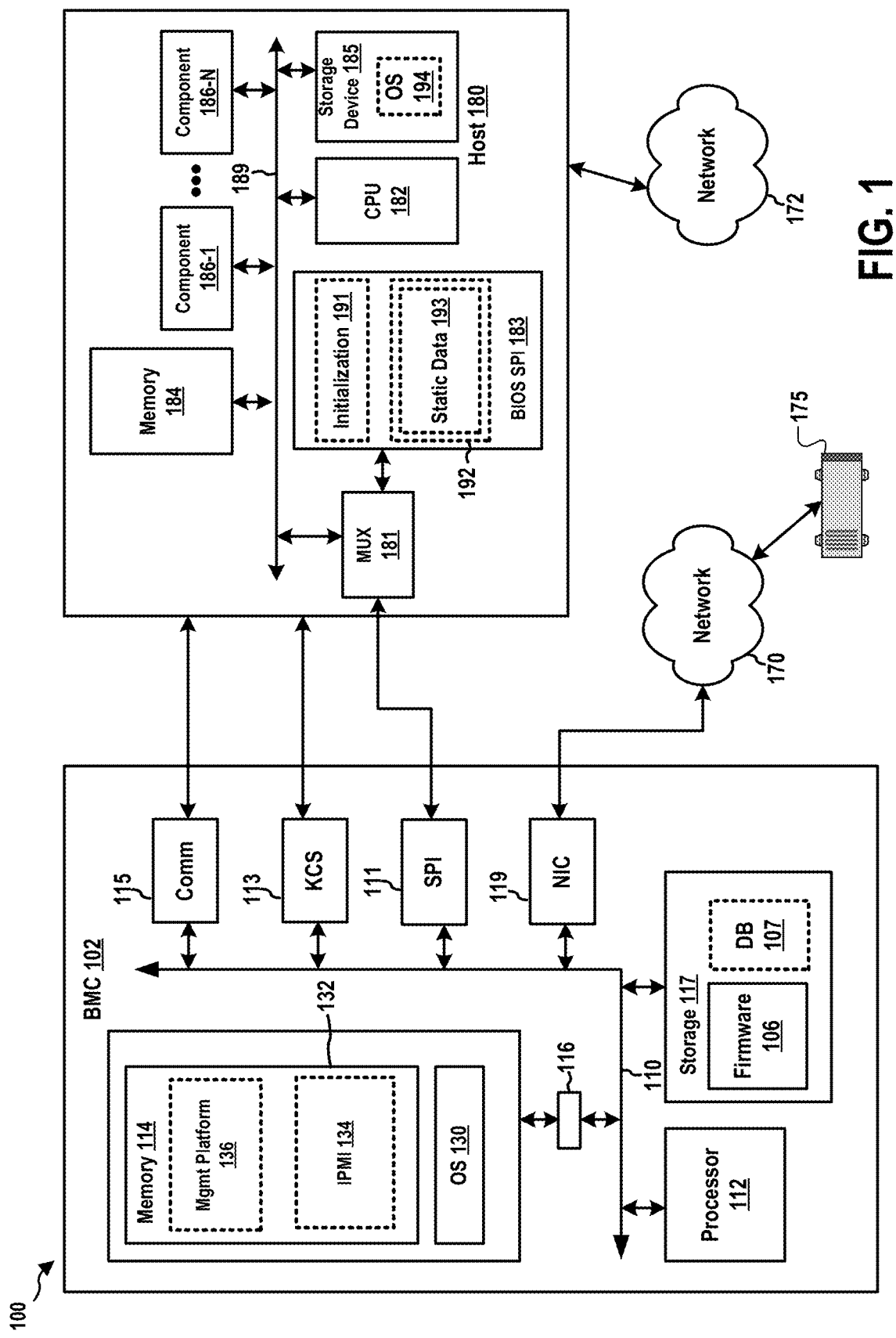
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A BMC may provide, through a management platform (e.g., REDFISH as described infra), management functionalities of configuration and settings of a Basic Input/Output System (BIOS) of a host of the BMC.

The REDFISH URI are exposed through the BMC. In certain configurations, the BIOS may wait for the BMC to complete booting and then the BIOS boots an Operating System (OS) of the host. During the host booting up, BIOS may send host BIOS configuration information to the BMC. This information may include static data, which contain the HTML pages and related information, and dynamic data about the current BIOS configuration at the host.

The static data sent by the BIOS may be large in size and may increase the host boot time. The communication between the BIOS and the BMC may be through many different interfaces. Each may have its own complexity and timing constraints. Accordingly, there is a need for a mechanism that allows the BMC to retrieve the static data from the host more efficiently.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a SPI interface 111, a KCS interface 113 (keyboard controller style), a network interface card 119, and other communication interfaces 115.

The communication interfaces 115 may include a Universal Serial Bus (USB) interface, a server management interface chip (SMIC) interface, a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the KCS interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the KCS interface 113, the SPI interface 111, and/or the communication interfaces 115 may be on the same chip. In addition, those components may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134 and a management platform 136. Further, the service components 132 may be implemented as a service stack. As such, the BMC firmware 106 can provide an embedded system to the BMC 102. In addition, the storage 117 may provide database(s) 107 that can be accessed by the IPMI services 134 or the management platform 136.

In one example, the management platform 136 may implements REDFISH specification, as defined in "Redfish Scalable Platforms Management API Specification Document Identifier: DSP0266 Date: Apr. 5, 2018 Version: 1.4.1," which is published by Distributed Management Task Force (DMTF) and is expressly incorporated by reference herein in its entirety.

The BMC 102 may be in communication with the host computer 180 through the KCS interface 113, the network interface card 119, the communication interfaces 115, the SPI interface 111, and/or the IPMI interface.

The host computer 180 includes a host CPU 182, a host memory 184, a storage device 185, a multiplexer 181, an initialization storage device 183, and component devices 186-1 to 186-N that may be interconnected with each other through a host bus system 189. In particular, the host bus system 189 may be connected to the initialization storage device 183 via a multiplexer 181. Further, in this example, the initialization storage device 183 is a SPI device. The multiplexer 181 is connected with the BMC 102 via the SPI interface 111 of the BMC 102. The multiplexer 181 switches access to the initialization storage device 183 between the host bus system 189 and the SPI interface 111. The multiplexer 181 may be configured to allow communications between the host bus system 189 and the initialization storage device 183 in default and disallow communications between the SPI interface 111 and the initialization storage device 183. The BMC 102 may send a particular signal to the multiplexer 181 via the SPI interface 111. Upon receiving the particular signal, the multiplexer 181 may switch access to the initialization storage device 183 from the host computer 180 to the SPI interface 111. That is, the multiplexer 181 allows communications between the SPI interface 111 and the initialization storage device 183 and disallow communications between the host bus system 189 and the initialization storage device 183. After obtaining access to the initialization storage device 183 through the SPI interface 111 and the multiplexer 181, the processing unit 112 may read data from and write data to the initialization storage device 183.

The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 302 shown in FIG. 3.

In this example, the processing unit 112 may have access to the initialization storage device 183 as a default configuration. After the host computer 180 is powered on, the host CPU 182 loads an initialization component 191 from the initialization storage device 183 into the host memory 184 and executes the initialization component 191. In one example, the initialization component 191 is a basic input/output system (BIOS). In another example, the initialization component 191 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 191 may include one or more UEFI boot services.

The initialization component 191, among other things, performs hardware initialization during the booting process (power-on startup). For example, when the initialization component 191 is a BIOS, the initialization component 191 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 191 then initializes the device on which it is located. When the initialization component 191 includes UEFI boot services, the initialization component 191 may also perform procedures similar to POST.

In a first technique, the initialization component 191 may send to the management platform 136 static data including Hypertext Markup Language (HTML) files, Cascading Style Sheets (CSS) files, and/or Javascripts (JS) files. Those files may contain data to be processed or stored at the BMC 102. The configuration data may include attribute registry, BIOS setup data, etc.

In certain configurations, the initialization component 191 may be configured to send to the management platform 136 configuration data of the initialization component 191. The configuration data may include dynamic data generated by the initialization component 191 during its execution.

In a second technique, instead of sending the static configuration data to the management platform 136, the initialization component 191 may store static configuration data 193 in the initialization storage device 183. More specifically, the initialization component 191 may allocate a particular static data storage area 192 for storing the static configuration data 193. As described supra, in the example, the initialization storage device 183 is a SPI device. The initialization storage device 183 may have a storage structure that is commonly known through a SPI interface. The initialization component 191 may determine a location (e.g., an address) of the static data storage area 192 in the storage structure. The initialization component 191 then writes the static configuration data 193 in the static data storage area 192.

In the second technique, subsequently, as described supra, the initialization component 191 sends dynamic data generated during the execution to the management platform 136. In addition, the initialization component 191 also sends an indication of the location of the static data storage area 192 to the management platform 136 through a message. The message may be attached to the dynamic data. Upon receiving the dynamic data with the message, the management platform 136 determines that the initialization component 191 has stored static configuration data 193 at the location in the initialization storage device 183.

To retrieve the static configuration data 193, the management platform 136 sends a particular signal to the multiplexer 181 to obtain access to the initialization storage device 183. The multiplexer 181, upon receiving the particular signal, switches communications with the initialization storage device 183 from the host bus system 189 to the SPI interface 111. Accordingly, the management platform 136 read data from the initialization storage device 183 through the SPI interface 111. As such, the management platform 136 has retrieved the static configuration data 193 from the initialization storage device 183. The management platform 136 further processes and stores the static configuration data 193.

The static configuration data 193 may be large in size (e.g., 300 KB, 1 MB, 5 MB, or 10 MB etc.). Through the second technique, the management platform 136 on the BMC 102 may acquire the static configuration data 193 faster than acquiring the static configuration data through the KCS interface 113 or other interfaces as described supra in the first technique.

The management platform 136 provides a management interface to uses based on the configuration data. Through the management interface, a user can access and manage the configuration of the initialization component 191. Subsequently, a client at a remote device 175 as described infra may request data from the management platform 136 through the management interface. The management platform 136 may send to the client HTML/CSS/JS files and/or processed data (including attribute registry, BIOS setup data, etc.).

After the initialization is performed, the initialization component 191 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
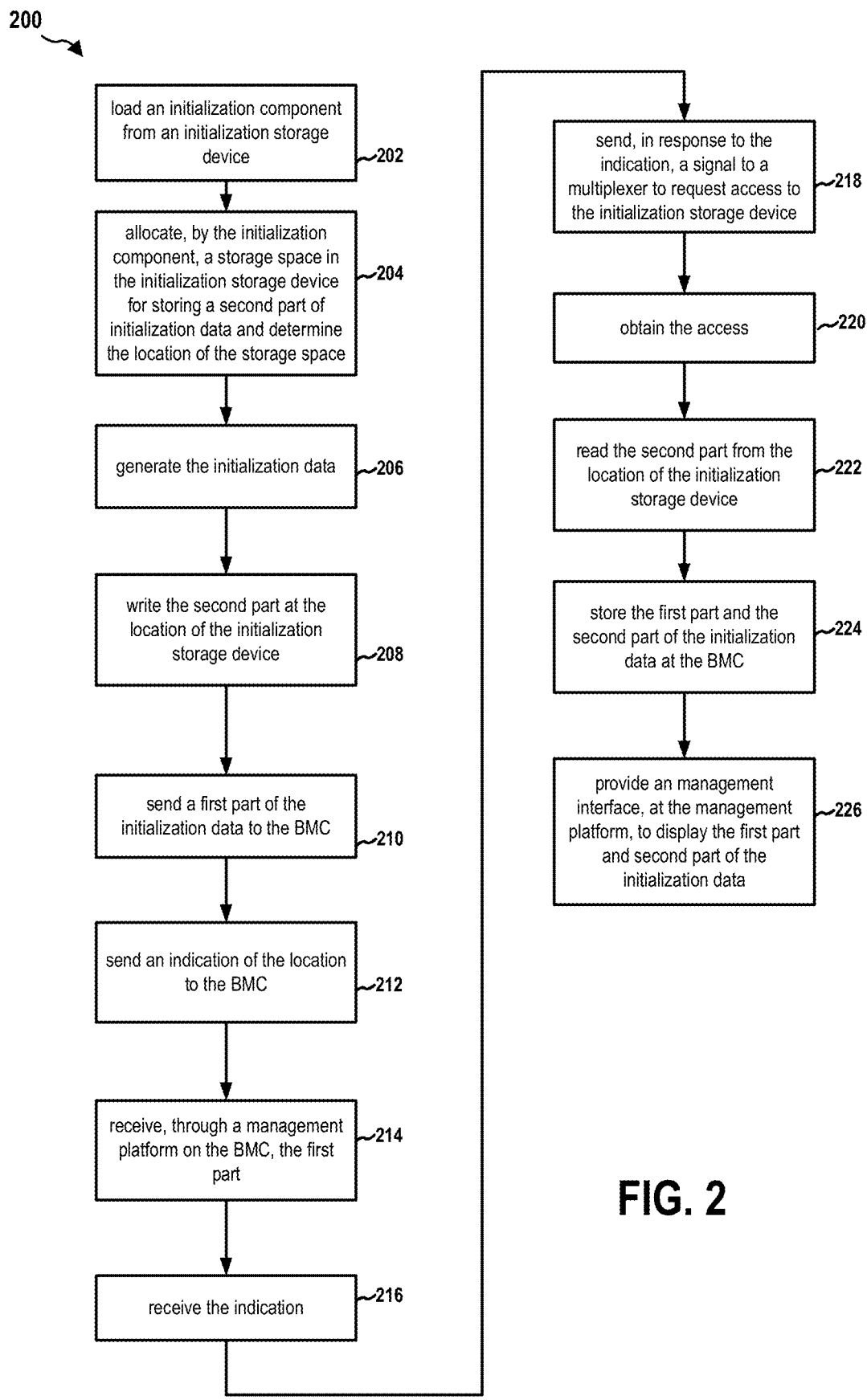
FIG. 2 is a flow chart of a method (process) for retrieving data.

FIG. 2 is a flow chart 200 of a method (process) for retrieving data. The method may be performed by a computer system (e.g., the computer system 100) including a host (e.g., the host computer 180) and a BMC (e.g., the BMC 102). The host includes an initialization component (e.g., the initialization component 191).

At operation 202, the host computer 180 loads the initialization component from an initialization storage device (e.g., the initialization storage device 183). At operation 204, the initialization component allocates a storage space (e.g., the static data storage area 192) in the initialization storage device for storing a second part (e.g., the static configuration data 193) of an initialization data and determines the location of the storage space.

At operation 206, the initialization component generates the initialization data. At operation 208, the initialization component writes the second part of the initialization data at the location of the initialization storage device. At operation 210, the initialization component sends a first part (e.g., dynamic data) of the initialization data to the BMC. At operation 212, the initialization component sends the indication (e.g., a message) to the BMC. In certain configurations, the first part of initialization data contains dynamic data based on a current configuration of the initialization component. The second part of initialization data contains static data provided by the initialization component.

At operation 214, the BMC receives, through a management platform (e.g., the management platform 136) on the BMC, the first part. At operation 216, the BMC receives the indication. At operation 218, the BMC sends, in response to the indication, a signal to a multiplexer (e.g., the multiplexer 181) to request the access. The multiplexer switches the access between the BMC and the host. At operation 220, the BMC obtains access to the initialization storage device. At operation 222, the BMC reads the second part of the initialization data from the location of the initialization storage device.

At operation 224, the BMC stores the first part and the second part of the initialization data at the BMC. At operation 226, the BMC provides a management interface, at the management platform, to display the first part and second part of the initialization data.

Figure 3:
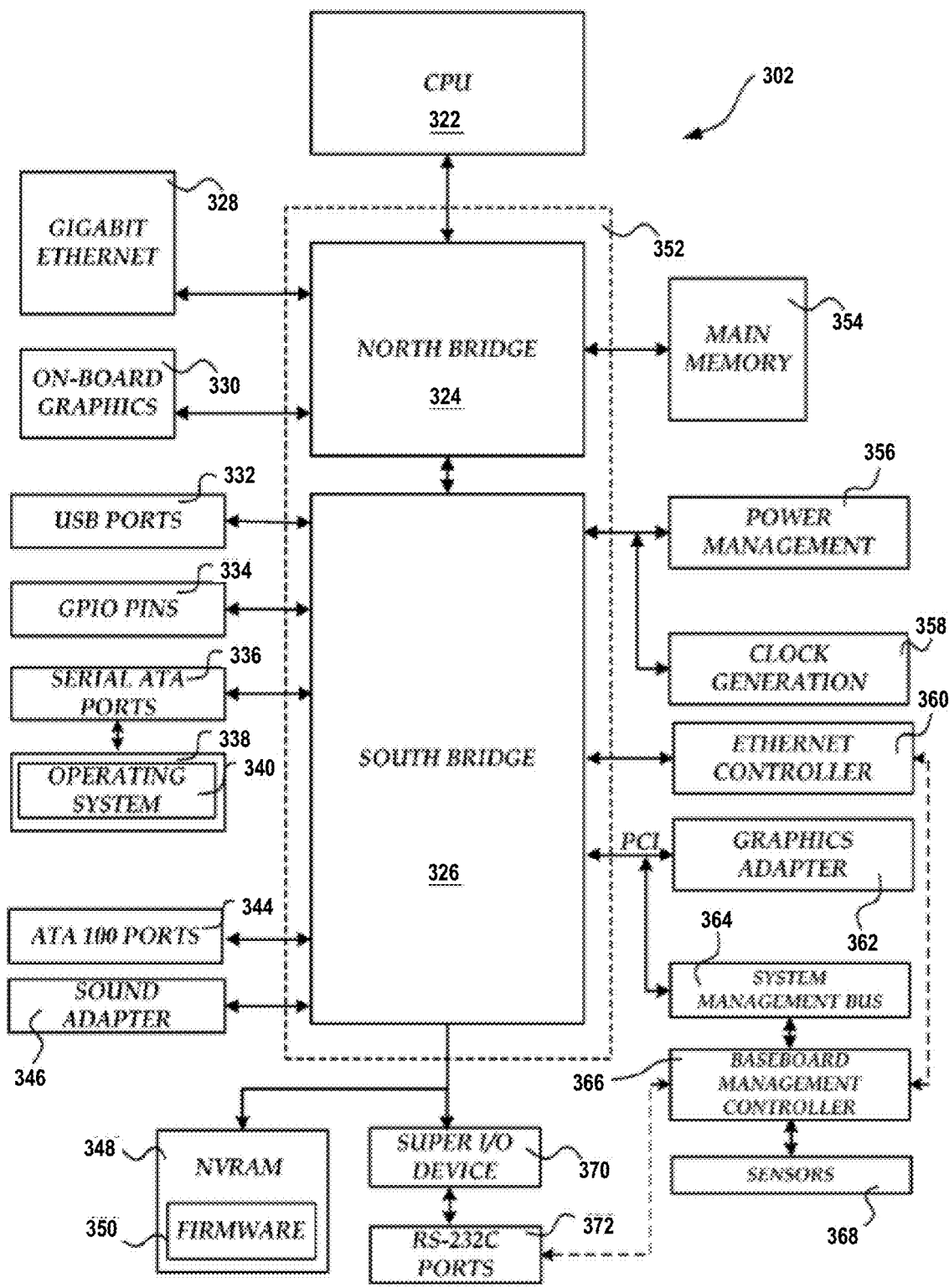
FIG. 3 shows a computer architecture for a computer.

FIG. 3 and the following discussion are intended to provide a brief, general description of one suitable computing environment in which aspects of the embodiments described herein may be implemented. In particular, FIG. 3 shows a computer architecture for a computer 302 that may be utilized to embody the host computer 180, as described supra. It should be appreciated that the computer architecture shown in FIG. 3 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 302 shown in FIG. 3 includes a baseboard, or "motherboard," which is a printed circuit board to which a multitude of components or devices may be connected by way of a system bus or other electrical communication path. In one illustrative embodiment, a CPU 322 operates in conjunction with a chipset 352. The CPU 322 is a standard central processor that performs arithmetic and logical operations necessary for the operation of the computer. The server computer 302 may include a multitude of CPUs 322.

The chipset 352 includes a north bridge 324 and a south bridge 326. The north bridge 324 provides an interface between the CPU 322 and the remainder of the computer 302. The north bridge 324 also provides an interface to a random access memory ("RAM") used as the main memory 354 in the computer 302 and, possibly, to an on-board graphics adapter 330. The north bridge 324 may also include functionality for providing networking functionality through a gigabit Ethernet adapter 328. The gigabit Ethernet adapter 328 is capable of connecting the computer 302 to another computer via a network. Connections which may be made by the network adapter 328 may include LAN or WAN connections. LAN and WAN networking environments are commonplace in offices, enterprise-wide computer networks, intranets, and the internet. The north bridge 324 is connected to the south bridge 326.

The south bridge 326 is responsible for controlling many of the input/output functions of the computer 302. In particular, the south bridge 326 may provide one or more USB ports 332, a sound adapter 346, an Ethernet controller 360, and one or more GPIO pins 334. The south bridge 326 may also provide a bus for interfacing peripheral card devices such as a graphics adapter 362. In one embodiment, the bus comprises a PCI bus. The south bridge 326 may also provide a system management bus 364 for use in managing the various components of the computer 302. Additional details regarding the operation of the system management bus 364 and its connected components are provided below.

The south bridge 326 is also operative to provide one or more interfaces for connecting mass storage devices to the computer 302. For instance, according to an embodiment, the south bridge 326 includes a serial advanced technology attachment ("SATA") adapter for providing one or more SATA ports 336 and an ATA 100 adapter for providing one or more ATA 100 ports 344. The SATA ports 336 and the ATA 100 ports 344 may be, in turn, connected to one or more mass storage devices such as the SATA disk drive 338 storing an operating system 340 and application programs.

As known to those skilled in the art, an operating system 340 comprises a set of programs that control operations of a computer and allocation of resources. An application program is software that runs on top of the operating system software, or other runtime environment, and uses computer resources to perform application specific tasks desired by the user. According to one embodiment of the invention, the operating system 340 comprises the LINUX operating system. According to another embodiment of the invention the operating system 340 comprises an operating system within the WINDOWS family of operating systems from MICROSOFT CORPORATION. According to another embodiment, the operating system 340 comprises the UNIX, LINUX, or SOLARIS operating system. It should be appreciated that other operating systems may also be utilized.

The mass storage devices connected to the south bridge 326, and their associated computer storage media, provide non-volatile storage for the computer 302. Although the description of computer storage media contained herein refers to a mass storage device, such as a hard disk or CD-ROM drive, it should be appreciated by those skilled in the art that computer storage media can be any available media that can be accessed by the computer 302.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 326 for connecting a "Super I/O" device 370. The Super I/O device 370 is responsible for providing a number of input/output ports, including a keyboard port, a mouse port, a serial interface 372, a parallel port, and other types of input/output ports. The LPC interface may also connect a computer storage media such as a ROM or a flash memory such as a NVRAM 348 for storing the firmware 350 that includes program code containing the basic routines that help to start up the computer 302 and to transfer information between elements within the computer 302.

As described briefly above, the south bridge 326 may include a system management bus 364. The system management bus 364 may include a BMC 366. The BMC 366 may be the BMC 102. In general, the BMC 366 is a microcontroller that monitors operation of the computer system 302. In a more specific embodiment, the BMC 366 monitors health-related aspects associated with the computer system 302, such as, but not limited to, the temperature of one or more components of the computer system 302, speed of rotational components (e.g., spindle motor, CPU Fan, etc.) within the system, the voltage across or applied to one or more components within the system 302, and the available or used capacity of memory devices within the system 302. To accomplish these monitoring functions, the BMC 366 is communicatively connected to one or more components by way of the management bus 364. In an embodiment, these components include sensor devices 368 for measuring various operating and performance-related parameters within the computer system 302. The sensor devices 368 may be either hardware or software based components configured or programmed to measure or detect one or more of the various operating and performance-related parameters.

It should also be appreciated that the computer 302 may comprise other types of computing devices, including hand-held computers, embedded computer systems, personal digital assistants, and other types of computing devices known to those skilled in the art. It is also contemplated that the computer 302 may not include all of the components shown in FIG. 3, may include other components that are not explicitly shown in FIG. 3, or may utilize an architecture completely different than that shown in FIG. 3.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, the computer system including a baseboard management controller (BMC), comprising:
   receiving, through a management platform on the BMC, a first part of initialization data from an initialization component of a host of the BMC;
   receiving an indication of a location at an initialization storage device of the host;
   obtaining access to the initialization storage device, and reading a second part of the initialization data from the location of the initialization storage device.

2. The method of claim 1, wherein the first part of initialization data contains dynamic data based on a current configuration of the initialization component, wherein the second part of initialization data contains static data provided by the initialization component.

3. The method of claim 1, wherein the obtaining the access comprising:
   sending, in response to the indication, a signal to a multiplexer to request the access, wherein the multiplexer switches the access between the BMC and the host.

4. The method of claim 3, further comprising: storing the first part and the second part of the initialization data at the BMC.

5. The method of claim 3, further comprising:
   providing a management interface, at the management platform, to display the first part and second part of the initialization data.

6. The method of claim 1, wherein the computer system further includes the host, the method further comprising:
   generating, at the initialization component of the host, the initialization data;
   writing the second part at the location of the initialization storage device;
   sending the first part to the BMC; and
   sending the indication.

7. The method of claim 6, further comprising:
   loading the initialization component from the initialization storage device; and
   allocating, by the initialization component, a storage space in the initialization storage device for storing the second part, wherein the location is associated with the storage space.

8. A computer system, comprising:
   a baseboard management controller (BMC), including
      a first memory; and
      first at least one processor coupled to the first memory and configured to:
         receive, through a management platform on the BMC, a first part of initialization data from an initialization component of a host of the BMC;
         receive an indication of a location at an initialization storage device of the host;
         obtain access to the initialization storage device; and
         read a second part of the initialization data from the location of the initialization storage device.

9. The computer system of claim 8, wherein the first part of initialization data contains dynamic data based on a current configuration of the initialization component, wherein the second part of initialization data contains static data provided by the initialization component.

10. The computer system of claim 8, wherein to obtain the access, the first at least one processor is further configured to:
   send, in response to the indication, a signal to a multiplexer to request the access, wherein the multiplexer switches the access between the BMC and the host.

11. The computer system of claim 10, wherein the first at least one processor is further configured to:
   store the first part and the second part of the initialization data at the BMC.

12. The computer system of claim 10, wherein the first at least one processor is further configured to:
   providing a management interface, at the management platform, to display the first part and second part of the initialization data.

13. The computer system of claim 8, wherein the computer system further includes the host, including:
   a second memory; and
   second at least one processor coupled to the second memory and configured to:
      generate, at the initialization component of the host, the initialization data;
      write the second part at the location of the initialization storage device;
      send the first part to the BMC; and
      send the indication.

14. The computer system of claim 13, wherein the second at least one processor is further configured to:
   load the initialization component from the initialization storage device; and
   allocate, by the initialization component, a storage space in the initialization storage device for storing the second part, wherein the location is associated with the storage space.

15. A non-transitory computer-readable medium storing computer executable code for operating a computer system, the computer system including a baseboard management controller (BMC), comprising code to:
   receive, through a management platform on the BMC, a first part of initialization data from an initialization component of a host of the BMC;
   receive an indication of a location at an initialization storage device of the host;
   obtain access to the initialization storage device; and
   read a second part of the initialization data from the location of the initialization storage device.

16. The non-transitory computer-readable medium of claim 15, wherein the first part of initialization data contains dynamic data based on a current configuration of the initialization component, wherein the second part of initialization data contains static data provided by the initialization component.

17. The non-transitory computer-readable medium of claim 15, wherein to obtain the access, the code is further configured to:
   send, in response to the indication, a signal to a multiplexer to request the access, wherein the multiplexer switches the access between the BMC and the host.

18. The non-transitory computer-readable medium of claim 17, wherein the code is further configured to:
   store the first part and the second part of the initialization data at the BMC.

19. The non-transitory computer-readable medium of claim 17, wherein the code is further configured to:
   providing a management interface, at the management platform, to display the first part and second part of the initialization data.

20. The non-transitory computer-readable medium of claim 15, wherein the computer system further includes the host, wherein the code is further configured to:
   generate, at the initialization component of the host, the initialization data;
   write the second part at the location of the initialization storage device;
   send the first part to the BMC; and
   send the indication.

\* \* \* \* \*